US010119272B1

(12) United States Patent
Shah et al.

(10) Patent No.: US 10,119,272 B1
(45) Date of Patent: Nov. 6, 2018

(54) INTERFERENCE FRAMES

(71) Applicant: Amazon Technologies, Inc., Seattle, WA (US)

(72) Inventors: Ashish Shah, Lincoln, MA (US); Amy Demicco, Somerville, MA (US); Curtis H. Nauseda, Maynard, MA (US); Yvetta Pols Sandhu, Winchester, MA (US); Brian Waite, Lunenburg, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/620,528

(22) Filed: Jun. 12, 2017

(51) Int. Cl.
*E04B 2/74* (2006.01)
*E04B 2/56* (2006.01)
*B66F 9/06* (2006.01)
*B65G 1/04* (2006.01)
*B65G 1/137* (2006.01)
*A47B 97/00* (2006.01)

(52) U.S. Cl.
CPC .............. *E04B 2/7433* (2013.01); *B66F 9/06* (2013.01); *E04B 2/56* (2013.01); *A47B 2097/008* (2013.01); *B65G 1/0492* (2013.01); *B65G 1/1378* (2013.01)

(58) Field of Classification Search
CPC  A47B 2097/008; B65G 2207/40; A47G 5/00; E04B 2/7422; E04B 2/7433
See application file for complete search history.

(56) References Cited

U.S. PATENT DOCUMENTS

| | | | | |
|---|---|---|---|---|
| 4,030,611 | A * | 6/1977 | Konstant | A47B 57/485 211/182 |
| 6,497,075 | B1 * | 12/2002 | Schreiner | A47B 21/06 52/127.6 |
| 7,140,307 | B1 * | 11/2006 | Wolbert | A47B 47/0075 108/153.1 |
| 8,280,547 | B2 | 10/2012 | D'Andrea et al. | |
| 9,087,314 | B2 | 7/2015 | Hoffman et al. | |
| 9,280,153 | B1 * | 3/2016 | Palamarchuk | G05D 1/00 |
| 9,877,585 | B2 * | 1/2018 | Sekine | A47B 97/00 |
| 2007/0288123 | A1 * | 12/2007 | D'Andrea | B66F 9/063 700/214 |
| 2010/0095614 | A1 * | 4/2010 | Trindade de Sousa Monteiro | A47B 87/00 52/220.7 |
| 2010/0263807 | A1 * | 10/2010 | Kinder | A47G 5/00 160/182 |
| 2014/0331939 | A1 * | 11/2014 | Gingerich | A01K 1/0005 119/416 |
| 2016/0107838 | A1 * | 4/2016 | Swinkels | B66F 9/063 414/273 |
| 2017/0340115 | A1 * | 11/2017 | Sekine | A47B 97/00 |

\* cited by examiner

*Primary Examiner* — Thomas Randazzo
(74) *Attorney, Agent, or Firm* — Kilpatrick Townsend & Stockton LLP

(57) ABSTRACT

A structure installed at a station can include an interference member held above a mobile drive unit area of the station. The interference member can be positioned to allow an inventory holder and a mobile drive unit to pass underneath. The interference member can also be positioned to contact a topside of the inventory holder to prevent the inventory holder from tipping into a worker area of the station that is adjacent to the mobile drive unit area.

17 Claims, 10 Drawing Sheets

US 10,119,272 B1

INTERFERENCE FRAMES

BACKGROUND

Modern inventory systems, such as those in mail order warehouses, supply chain distribution centers, airport luggage systems, and custom-order manufacturing facilities, respond to requests for inventory items using combinations of automated machines and human workers. For example, a human worker may be instructed to remove an inventory item from a robot-operated storage shelf as part of fulfilling a customer order for the inventory item.

BRIEF DESCRIPTION OF THE DRAWINGS

Various examples in accordance with the present disclosure will be described with reference to the drawings, in which.

DETAILED DESCRIPTION

Figure 1:
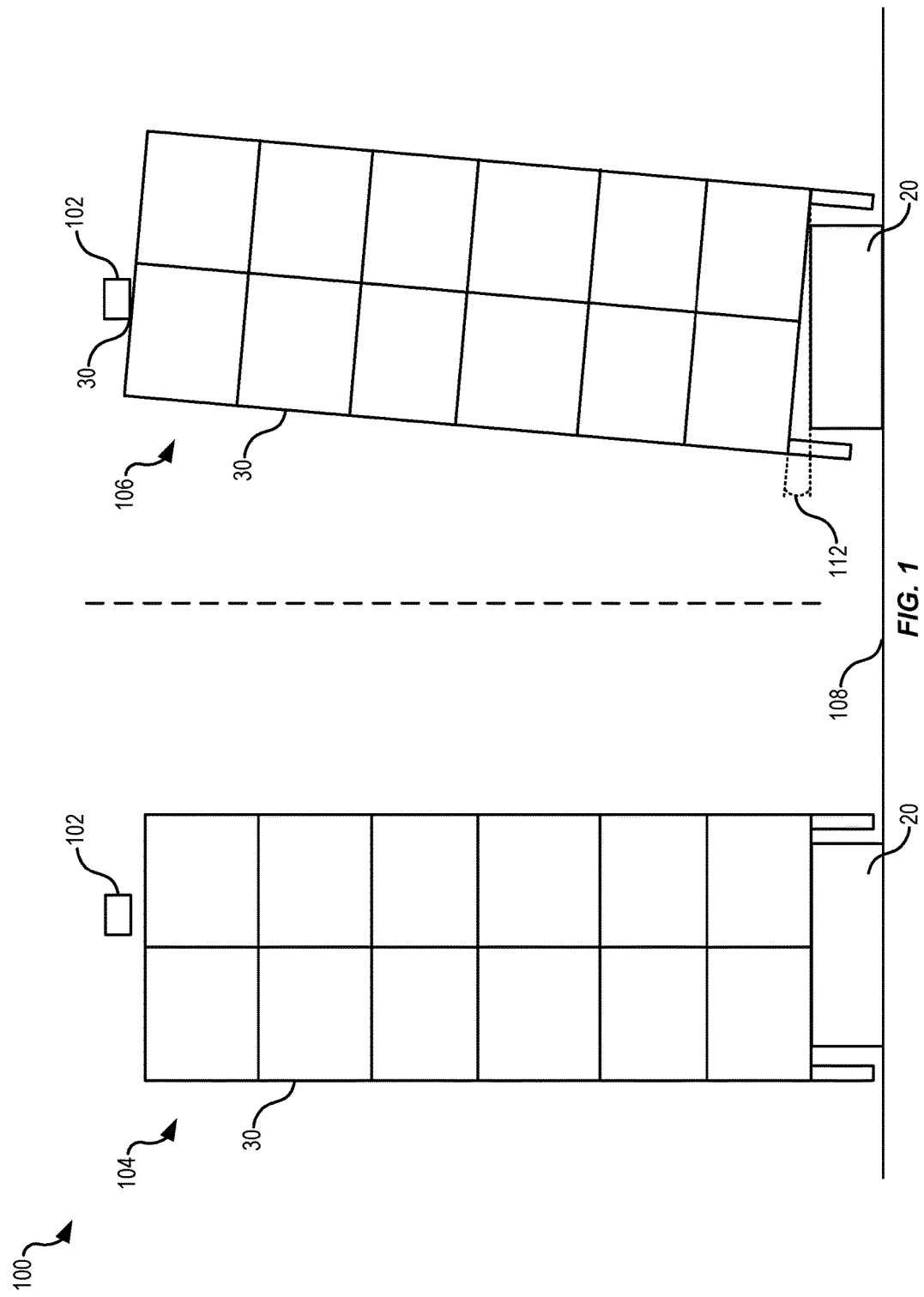
FIG. 1 illustrates an interference member with respect to an upright orientation and a tilted orientation of an inventory holder, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to an interference system that physically prevents an inventory holder from tilting beyond some threshold. The inventory holder together with other inventory holders can be utilized in an inventory system to store inventory items. Robotic mobile drive units can be utilized in the inventory system to transport the inventory holders between locations within the inventory system (e.g., storage locations, inventory stations, and other similar locations). At the inventory stations, human workers may interact with the inventory holders to perform certain tasks (e.g., remove items from the inventory holders, place items into inventory holders, count items, and perform other similar inventory processing tasks). The interference system described herein can be implemented at the inventory stations to prevent the inventory holders from tipping over while the human workers interact with the inventory holders. The interference systems can be placed at the inventory stations in a manner that does not obstruct faces of the inventory holders. This gives a human worker unobstructed access to all compartments of a presented face of the inventory holder. While the interference systems of this specification are described with reference to inventory stations, it should be understood that the interference system can be installed at other locations in the inventory system where there is possibility that the inventory holders will tip.

Turning now to a particular example, a vertical barrier, such as a fence or wall, is provided at an inventory station. The vertical barrier separates a worker area from a mobile drive unit area at the inventory station. Through an opening in the vertical barrier, human workers located in the worker area can perform inventory tasks on an inventory holder when the mobile drive unit and inventory holder are parked adjacent to the opening in the mobile drive unit area. An interference member is positioned above the mobile drive unit area at a location where the mobile drive unit and the inventory holder are parked. For example, the interference member can be connected to the vertical barrier, a ceiling, and/or other structures at the inventory station (e.g., an interference frame). The interference member is mounted at a vertical mounting elevation that is greater than a combined height of the inventory holder coupled to the mobile drive unit. In this manner, when the inventory holder is in an upright orientation (e.g., un-tilted), the inventory holder freely passes underneath the interference member (e.g., without contacting the interference member). If the inventory holder, however, begins to tilt (e.g., toward the opening in the vertical barrier), the interference member will physically contact a topside of the inventory holder and prevent the inventory holder from tilting any further. When the tilting is toward the opening in the vertical barrier and therefore the worker area, the interference member provides for worker safety by preventing the inventory holder from falling onto the worker or from dumping the contents of the inventory holder into the worker area.

Turning now to the figures, FIG. 1 illustrates an interference system 100 including an interference member 102 with respect to an inventory holder 40 in an upright orientation 104 and a tilted orientation 106, according to at least one example. In FIG. 1, the inventory holder 30 is detachably coupled to a mobile drive unit 20. It should be appreciated, however, that the techniques described with reference to the interference member 102 may also be applied in systems when the inventory holder 30 is decoupled from the mobile drive unit 20.

The interference member 102 can positioned at any suitable location above the inventory holder 30. The interference member 102 can be attached to an interference frame that is supported by a surface 108, supported by a ceiling above, supported by a vertical barrier, or supported in any other suitable manner.

As described herein, the interference member 102 can be any suitable structure such as a beam, a tube, a planar sheet of material, a tensioned cable, and/or other structures having similar characteristics. The interference member 102 may itself be sufficiently rigid and/or may be so supported in order to resist a rotational force applied to the interference member 102 when the inventory holder 30 is in the tilted orientation 106. In this manner, the interference member 102 prevents the inventory holder 30 from tilting beyond the tilted orientation 106.

The upright orientation 104 is the orientation in which the inventory holder 30 is typically held. The mobile drive unit 20 and the inventory holder 30 are designed to ensure that the inventory holder 30 is held in the upright orientation 104. In some examples, however, the inventory holder 30 may be caused to tilt about a top surface of the mobile drive unit 20, or may tilt when not supported by the mobile drive unit 20. This may be a result of unbalanced loading of inventory items into the inventory holder 30, unbalanced lifting of the inventory holder 30 by the mobile drive unit 20, and/or application of external forces on the inventory holder 30 (e.g., a human worker pulling or pushing on the inventory holder 30). For example, the human worker may accidently push or pull on the inventory holder 30 as part of loading inventory items into compartments of the inventory holder 30.

Between the upright orientation 104 and the tilted orientation 106, the inventory holder 30 may tilt through some tilt angle 112. The tilt angle 112 can be measured between the mobile drive unit 20 and the inventory holder 30. In some examples, the interference member 102 may be positioned with respect to the inventory holder 30 in a manner that is considerate of the tilt angle 112. For example, the greater the value of the tilt angle 112, the more unstable the inventory holder 30 will become. Thus, positioning the interference member 102 may be done in a manner that seeks to minimize the tilt angle 112. In some examples, the tilt angle 112 is between two to ten degrees. In some examples, the tilt angle 112 is greater than ten degrees.

The interference member 102 may be configured and positioned to prevent undue tilting of the inventory holder 30 in at least one direction. For example, as illustrated in FIG. 1, the interference member 102 has prevented the inventory holder 30 from tilting beyond the tilted orientation 106, which is a tilt to the right of FIG. 1. The interference member 102 may also prevent undue tilting in one or more of three other directions (e.g., to the left, inward, and outward). In addition to the tilting of the inventory holder 30 being produced by external forces (e.g., a worker pulling and/or pushing on the inventory holder 30, a collision between the inventory holder 30 and some fixed structure, etc.). The tilting may be produced by the mobile drive unit 20. For example, the mobile drive unit 20 may be outfitted with a tilting/lifting table that can pick up and tilt the inventory holder 30. Such tilting may be desirable to improve human access to certain inventory items stored in the inventory holder 30, to account for inclined or declined ramp travel, to account for imbalanced loads in the inventory holder 30, and/or to account for acceleration and deceleration while the inventory holder 30 is moving.

Figure 2:
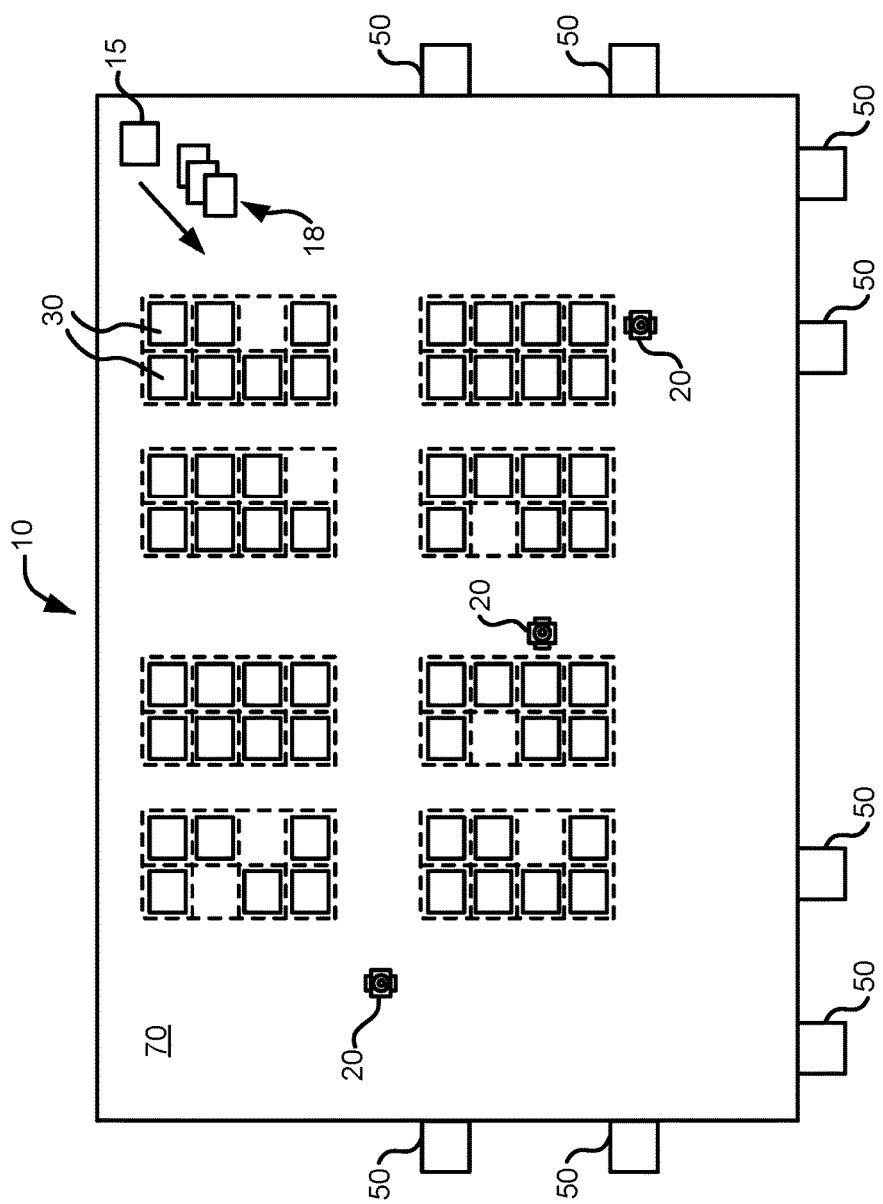
FIG. 2 illustrates components of an inventory system, according to at least one example.

FIG. 2 illustrates the components of an inventory system 10 in which the interference system 100 can be implemented. The inventory system 10 may include a management module 15, one or more mobile drive units 20, one or more inventory holders 30, and one or more inventory stations 50. The mobile drive units 20 transport the inventory holders 30 between points within a workspace 70 and between other workspaces located above and/or below the workspace 70 in response to commands communicated by the management module 15. Each of the inventory holders 30 may be configured with one or more compartments for containing one or more inventory items. In some examples, the inventory holders 30 may be inventory holders configured to hold one or more containers which may hold inventory items. Thus, the inventory system 10 may be capable of moving inventory items between locations within the workspace 70 to facilitate the entry, processing, and/or removal of inventory items from the inventory system 10 and the completion of other tasks involving inventory items.

The management module 15 may assign tasks to appropriate components of the inventory system 10 and coordinate operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of the inventory holders 30, or any other operations associated with the functionality supported by the inventory system 10 and its various components. The management module 15 may select components of the inventory system 10 to perform these tasks and communicate appropriate commands and/or data to the selected components to facilitate completion of these operations. Although shown in FIG. 2 as a single, discrete component, the management module 15 may represent multiple components and may represent or include portions of the mobile drive units 20 or other components of the inventory system 10. As a result, any or all of the interaction between a particular mobile drive unit 20 and the management module 15 that is described below may, in some examples, represent peer-to-peer communication between that mobile drive unit 20 and one or more other mobile drive units 20. The components and operation of an example of the management module 15 are discussed further below with respect to FIG. 3. In some examples, the management module 15 may be distributed between a server and the mobile drive units 20. In this example, the server may provide instructions to the mobile drive units 20 which may process the instructions and generate other instructions to manage components of the mobile drive units 20. In some examples, the management module 15 may include any suitable combination of analog and digital components configured to implement the techniques described herein. For example, the management module 15 may include an analog controller configured to control certain aspects of the operation of the mobile drive unit (e.g., adjusting a mounting angle of the inventory holder 30 relative to the mobile drive unit 20 to account for the distribution of mass of the inventory holder 30, to account for the location of a center of gravity of the inventory holder 30, to account for movement of inventory items in the inventory holder 30, to account for movement of the inventory holder 30 when coupled to the mobile drive unit 20, or to account for any other condition affecting stability of the inventory holder 30).

The mobile drive units 20 may move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular example of the inventory system 10, the mobile drive units 20 represent independent, self-powered devices configured to freely move about the workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative examples, the mobile drive units 20 represent elements of a tracked inventory system configured to move the inventory holders 30 along tracks, rails, cables, crane system, or other guidance or support elements traversing the workspace 70. In such an example, the mobile drive units 20 may receive power and/or support through a connection to the guidance elements, such as a powered rail. Additionally, in some examples of the inventory system 10, the mobile drive units 20 may be configured to utilize alternative conveyance equipment to move within the workspace 70 and/or between separate portions of the workspace 70. The components and operation of an example of a mobile drive unit 20 are discussed further below with respect to FIGS. 4 and 5.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, some examples of the mobile drive unit 20 may communicate with the management module 15 and/or with one another using 802.11, Bluetooth, or Infrared Data Association ("IrDA") standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In some examples, the inventory holders 30 may store inventory items within containers. In a particular example, the inventory holders 30 may include multiple storage shelves with each storage shelf capable of holding one or more containers. Within each container may be held one or more types of inventory items. The inventory holders 30 are capable of being carried, rolled, and/or otherwise moved by the mobile drive units 20. In some examples, the inventory holder 30 may provide additional propulsion to supplement that provided by the mobile drive unit 20 when moving the inventory holder 30. In some examples, the inventory holders 30 may store inventory items within one or more storage bins.

Additionally, in some examples, inventory items 40 may also hang from hooks or bars (not shown) within or on the inventory holder 30. In general, the inventory holder 30 may store the inventory items 40 in any appropriate manner within the inventory holder 30 and/or on the external surface of the inventory holder 30.

Additionally, each inventory holder 30 may include a plurality of faces. In some examples, each container may be accessible through one or more faces of the inventory holder 30. For example, in a particular example, the inventory holder 30 includes four faces. In such an example, containers located at a corner of two faces may be accessible through either of those two faces, while each of the other containers is accessible through an opening in one of the four faces. The mobile drive unit 20 may be configured to rotate the inventory holder 30 at appropriate times to present a particular face and the containers accessible from that face to an operator or other components of the inventory system 10.

Inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility, and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in some examples of the inventory system 10, boxes containing completed orders may themselves represent inventory items.

In some examples, the inventory system 10 may also include one or more inventory stations 50. The inventory stations 50 represent locations designated for the completion of particular tasks involving inventory items. Such tasks may include the removal of inventory items and/or containers from the inventory holders 30, the introduction of inventory items and/or containers into the inventory holders 30, the counting of inventory items and/or containers in the inventory holders 30, the decomposition of inventory items (e.g. from pallet- or case-sized groups to individual inventory items) into containers in the inventory holders 30, the consolidation of inventory items and/or containers between the inventory holders 30, transfer of inventory items and/or containers between the inventory holders 30, and/or the processing or handling of inventory items in any other suitable manner. In some examples, the inventory stations 50 may just represent the physical locations where a particular task involving inventory items can be completed within the workspace 70. In alternative examples, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks on inventory items, such as packing, counting, or transferring inventory items, as part of the operation of the inventory system 10. The interference system 100 may be implemented at the inventory stations 50.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 2 shows, for the purposes of illustration, an example of the inventory system 10 in which the workspace 70 includes a fixed, predetermined, and finite physical space, some examples of the inventory system 10 may include the mobile drive units 20 and the inventory holders 30 that are configured to operate within a workspace 70 that is of variable dimensions and/or an arbitrary geometry. While FIG. 2 illustrates a particular example of the inventory system 10 in which the workspace 70 is entirely enclosed in a building, alternative examples may utilize workspaces 70 in which some or all of the workspace 70 is located outdoors, within a vehicle (such as a cargo ship), located across more than one floor, or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10. Depending on the component and the task to be completed, a particular task assignment 18 may identify locations, components, and/or actions associated with the corresponding task and/or any other appropriate information to be used by the relevant component in completing the assigned task.

In some examples, the management module 15 generates the task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in some examples, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more task assignments 18, management module 15 transmits the generated task assignments 18 to appropriate components for completion of the corresponding task. The relevant components then execute their assigned tasks.

With respect to the mobile drive units 20 specifically, the management module 15 may, in some examples, communicate the task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriately based on the configuration, characteristics, and/or state of the inventory system 10, as a whole, or individual components of the inventory system 10. For example, in some examples, such decisions may be based on the popularity of particular inventory items, the staffing of a particular inventory station 50, the tasks currently assigned to a particular mobile drive unit 20, and/or any other appropriate considerations.

As part of completing these tasks, the mobile drive units 20 may dock with and transport the inventory holders 30 within the workspace 70. In some examples, docking with an inventory holder 30 may include coupling components of the mobile drive unit 20 to components of the inventory holder 30. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. While the description below focuses on some examples of the mobile drive unit 20 and the inventory holder 30 that are configured to dock in a particular manner, alternative examples of the mobile drive unit 20 and the inventory holder 30 may be configured to dock in any manner suitable to allow the mobile drive unit 20 to move the inventory holder 30 within the workspace 70. Additionally, as noted below, in some examples, the mobile drive units 20 represent all or portions of the inventory holders 30. In such examples, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the management module 15 may interact with the relevant components to ensure the efficient use of space, equipment, manpower, and other resources available to the inventory system 10. As one specific example of such interaction, the management module 15 is responsible, in some examples, for planning the paths the mobile drive units 20 take when moving within the workspace 70 and for allocating use of a particular portion of the workspace 70 to a particular mobile drive unit 20 for purposes of completing an assigned task. In such examples, the mobile drive units 20 may, in response to being assigned a task, request a path to a particular destination associated with the task. Moreover, while the description below focuses on one or more examples in which the mobile drive unit 20 requests paths from the management module 15, the mobile drive unit 20 may, in alternative examples, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in some examples, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, some examples of the inventory system 10 may be able to support a number of techniques for efficiently executing various aspects of the operation of the inventory system 10. As a result, some examples of the management module 15 may, by implementing one or more management techniques described below, enhance the efficiency of the inventory system 10 and/or provide other operational benefits.

Figure 3:
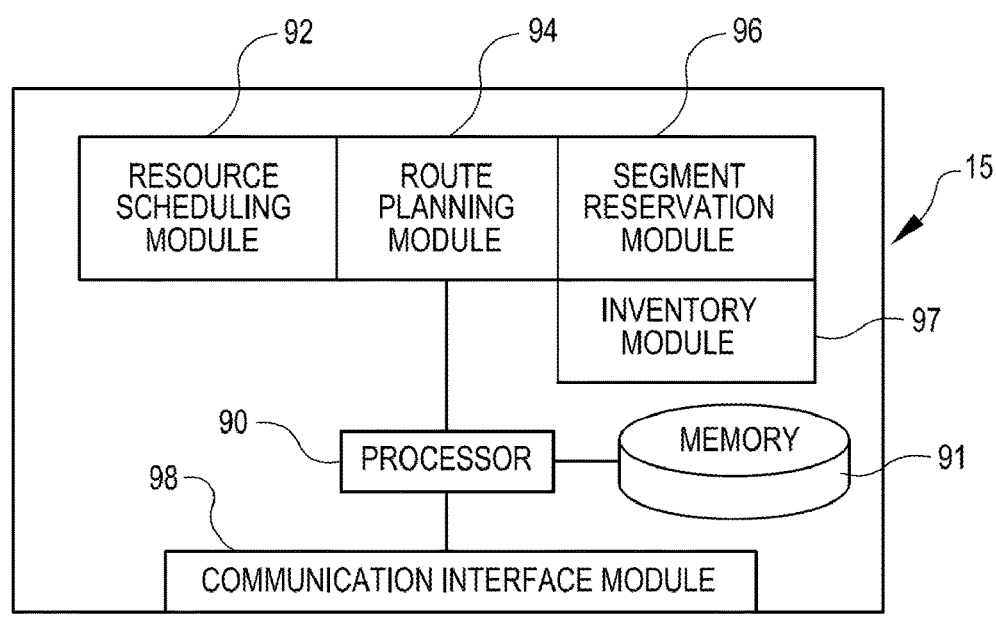
FIG. 3 illustrates in greater detail the components of an example management module that may be utilized in some examples of the inventory system shown in FIG. 2.

FIG. 3 illustrates in greater detail the components of a particular example of the management module 15. As shown, the example includes a resource scheduling module 92, a route planning module 94, a segment reservation module 96, an inventory module 97, a communication interface module 98, a processor 90, and a memory 91. The management module 15 may represent a single component, multiple components located at a central location within the inventory system 10, or multiple components distributed throughout inventory system 10. For example, the management module 15 may represent components of one or more mobile drive units 20 that are capable of communicating information between the mobile drive units 20 and coordinating the movement of the mobile drive units 20 within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits ("ASICs"), field programmable gate arrays ("FPGAs"), digital signal processors ("DSPs") and any other suitable specific or general purpose processors.

The memory 91 stores processor instructions, inventory requests, reservation information, state information for the various components of the inventory system 10 and/or any other appropriate values, parameters, or information utilized by the management module 15 during operation. For example, the memory 91 may store an overall warehouse map that includes a representation of the inventory system in which the management module 15 operates. The memory 91 may represent any collection and arrangement of volatile or nonvolatile, local or remote devices suitable for storing data. Examples of the memory 91 include, but are not limited to, random access memory ("RAM") devices, read only memory ("ROM") devices, magnetic storage devices, optical storage devices or any other suitable data storage devices.

The resource scheduling module 92 processes received inventory requests and generates one or more assigned tasks to be completed by the components of the inventory system 10. The resource scheduling module 92 may also select one or more appropriate components for completing the assigned tasks and, using the communication interface module 98, communicate the assigned tasks to the relevant components. Additionally, the resource scheduling module 92 may also be responsible for generating assigned tasks associated with various management operations, such as prompting the mobile drive units 20 to recharge batteries or have batteries replaced, instructing the inactive mobile drive units 20 to park in a location outside the anticipated traffic flow or a location near the anticipated site of future tasks, and/or directing the mobile drive units 20 selected for repair or maintenance to move towards a designated maintenance station.

The route planning module 94 receives route requests from the mobile drive units 20. These route requests identify one or more destinations associated with a task the requesting mobile drive unit 20 is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting mobile drive unit 20 using the communication interface module 98.

The segment reservation module 96 receives reservation requests from the mobile drive units 20 attempting to move along paths generated by the route planning module 94. These reservation requests request the use of a particular portion of the workspace 70 (referred to herein as a "segment") to allow the requesting mobile drive unit 20 to avoid collisions with other mobile drive units 20 while moving across the reserved segment. In response to received reservation requests, the segment reservation module 96 transmits a reservation response granting or denying the reservation request to the requesting mobile drive unit 20 using the communication interface module 98.

The inventory module 97 maintains information about the location and number of the inventory items 40 in the inventory system 10. Information can be maintained about the number of the inventory items 40 in a particular inventory holder 30, and the maintained information can include the location of those inventory items 40 in the inventory holder 30. The inventory module 97 can also communicate with the mobile drive units 20, utilizing the task assignments 18 to maintain, replenish or move the inventory items 40 within the inventory system 10.

The communication interface module 98 facilitates communication between the management module 15 and other components of the inventory system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the inventory system 10. In some examples, the management module 15 may communicate using communication protocols such as 802.11, Bluetooth, or IrDA standards. Furthermore, the management module 15 may, in some examples, represent a portion of the mobile drive unit 20 or other components of the inventory system 10. In such examples, the communication interface module 98 may facilitate communication between the management module 15 and other parts of the same system component.

In general, the resource scheduling module 92, the route planning module 94, the segment reservation module 96, the inventory module 97, and the communication interface module 98, may each represent any appropriate hardware and/or software suitable to provide the described functionality. In addition, as noted above, the management module 15 may, in some examples, represent multiple different discrete components and any or all of the resource scheduling module 92, the route planning module 94, the segment reservation module 96, the inventory module 97, and the communication interface module 98, may represent components physically separate from the remaining elements of the management module 15. Moreover, any two or more of the resource scheduling module 92, the route planning module 94, the segment reservation module 96, the inventory module 97, and the communication interface module 98, may share common components. For example, in some examples, the resource scheduling module 92, the route planning module 94, the segment reservation module 96, and the inventory module 97 represent computer processes executing on the processor 90 and the communication interface module 98 comprises a wireless transmitter, a wireless receiver, and a related computer process executing on the processor 90.

Figure 4:
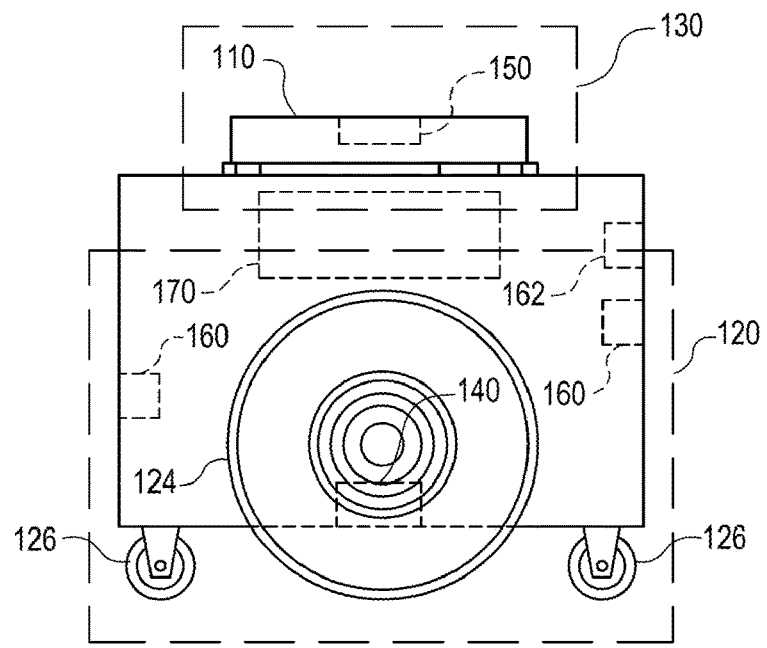
FIGS. 4 and 5 illustrate in greater detail an example mobile drive unit that may be utilized in some examples of the inventory system shown in FIG. 2.
Figure 5:
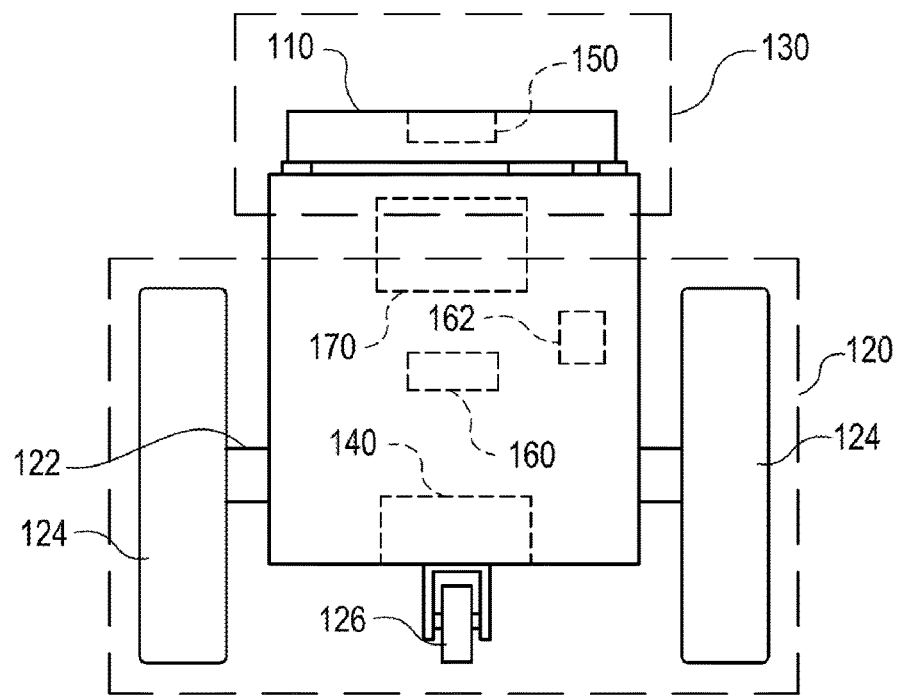

FIGS. 4 and 5 illustrate in greater detail the components of a particular example of the mobile drive unit 20. In particular, FIGS. 4 and 5 include a side and front view of an example mobile drive unit 20. The mobile drive unit 20 includes a platform 110, a drive module 120, a docking head assembly 130, and a control module 170. The platform 110 may be considered a docking head or docking platform. The docking head assembly 130 may be an actuator configured to move the platform 110 to engage with the inventory holder 30. Additionally, the mobile drive unit 20 may include one or more sensors configured to detect or determine the location of the mobile drive unit 20, the inventory holder 30, and/or other appropriate elements of the inventory system 10. In the illustrated example, the mobile drive unit 20 includes a position sensor 140, a holder sensor 150, an obstacle sensor 160, and an identification signal transmitter 162.

The platform 110, in some examples of the mobile drive unit 20, couples the mobile drive unit 20 to the inventory holder 30 and/or supports the inventory holder 30 when the mobile drive unit 20 is docked to the inventory holder 30. The platform 110 may additionally allow the mobile drive unit 20 to maneuver the inventory holder 30, such as by lifting the inventory holder 30, propelling the inventory holder 30, rotating the inventory holder 30, tilting the inventory holder 30, and/or moving the inventory holder 30 in any other appropriate manner. The platform 110 may also include any appropriate combination of components, such as ribs, spikes, and/or corrugations, to facilitate such manipulation of the inventory holder 30. For example, in some examples, the platform 110 may include a high-friction portion that abuts a portion of the inventory holder 30 while the mobile drive unit 20 is docked to the inventory holder 30. In such examples, frictional forces created between the high-friction portion of the platform 110 and a surface of the inventory holder 30 may induce translational and rotational movement in the inventory holder 30 when the platform 110 moves and rotates, respectively. As a result, the mobile drive unit 20 may be able to manipulate the inventory holder 30 by moving or rotating the platform 110, either independently or as a part of the movement of the mobile drive unit 20 as a whole.

The drive module 120 propels the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated example, the drive module 120 includes a motorized axle 122, a pair of motorized wheels 124, and a pair of stabilizing wheels 126. One motorized wheel 124 is located at each end of the motorized axle 122, and one stabilizing wheel 126 is positioned at each end of the mobile drive unit 20.

The docking head assembly 130 moves the platform 110 towards the inventory holder 30 to facilitate docking of the mobile drive unit 20 and the inventory holder 30. The docking head assembly 130 may also be capable of adjusting the position or orientation of the platform 110 in other suitable manners to facilitate docking. The docking head assembly 130 may include any appropriate components, based on the configuration of the mobile drive unit 20 and the inventory holder 30, for moving the platform 110 or otherwise adjusting the position or orientation of the platform 110. For example, in the illustrated example, the docking head assembly 130 includes a motorized shaft (not shown) attached to the center of the platform 110. The motorized shaft is operable to lift the platform 110 as appropriate for docking with the inventory holder 30.

The drive module 120 may be configured to propel the mobile drive unit 20 in any appropriate manner. For example, in the illustrated example, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated example, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of the mobile drive unit 20 in any appropriate manner. For example, in some examples, the workspace 70 associated with the inventory system 10 includes a number of fiducial marks that mark points on a two-dimensional grid that covers all or a portion of the workspace 70. In such examples, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location of the mobile drive unit 20 and to aid in navigation when moving within the workspace 70.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 represents one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In some examples, the obstacle sensor 160 may transmit information describing objects it detects to the control module 170 to be used by the control module 170 to identify obstacles and to take appropriate remedial actions to prevent the mobile drive unit 20 from colliding with obstacles and/or other objects.

The obstacle sensor 160 may also detect signals transmitted by other mobile drive units 20 operating in the vicinity of the illustrated mobile drive unit 20. For example, in some examples of the inventory system 10, one or more mobile drive units 20 may include an identification signal transmitter 162 that transmits a drive identification signal. The drive identification signal indicates to the other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20.

Additionally, in some examples, the obstacle sensor 160 may also be capable of detecting state information transmitted by the other mobile drive units 20. For example, in some examples, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In some examples, the mobile drive unit 20 may use the state information transmitted by other mobile drive units to avoid collisions when operating in close proximity with those other mobile drive units.

The control module 170 monitors and/or controls operation of the drive module 120 and the docking head assembly 130. The control module 170 may also receive information from sensors such as the position sensor 140 and the holder sensor 150 and adjust the operation of the drive module 120, the docking head assembly 130, and/or other components of the mobile drive unit 20 based on this information. Additionally, in some examples, the mobile drive unit 20 may be configured to communicate with a management device of the inventory system 10 and the control module 170 may receive commands transmitted to the mobile drive unit 20 and communicate information back to the management device utilizing appropriate communication components of the mobile drive unit 20. The control module 170 may include any appropriate hardware and/or software suitable to provide the described functionality. In some examples, the control module 170 includes a general-purpose microprocessor programmed to provide the described functionality. Additionally, the control module 170 may include all or portions of the docking head assembly 130, the drive module 120, the position sensor 140, and/or the holder sensor 150, and/or share components with any of these elements of the mobile drive unit 20.

Moreover, in some examples, the control module 170 may include hardware and software located in components that are physically distinct from the device that houses the drive module 120, the docking head assembly 130, and/or the other components of the mobile drive unit 20 described above. For example, in some examples, each mobile drive unit 20 operating in the inventory system 10 may be associated with a software process (referred to here as a "drive agent") operating on a server that is in communication with the device that houses the drive module 120, the docking head assembly 130, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the inventory system 10 on behalf of the device that physically houses the drive module 120, the docking head assembly 130, and the other appropriate components of the mobile drive unit 20. As a result, for the purposes of this description and the claims that follow, the term "mobile drive unit" includes software and/or hardware, such as agent processors, that provides the described functionality on behalf of the mobile drive unit 20 but that may be located in physically distinct devices from the drive module 120, the docking head assembly 130, and/or the other components of the mobile drive unit 20 described above.

While FIGS. 4 and 5 illustrate a particular example of the mobile drive unit 20 containing certain components and configured to operate in a particular manner, the mobile drive unit 20 may represent any appropriate component and/or collections of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in some examples, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such examples, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collections of components configured to transport and/or facilitate the transport of the inventory holders 30.

Figure 6:
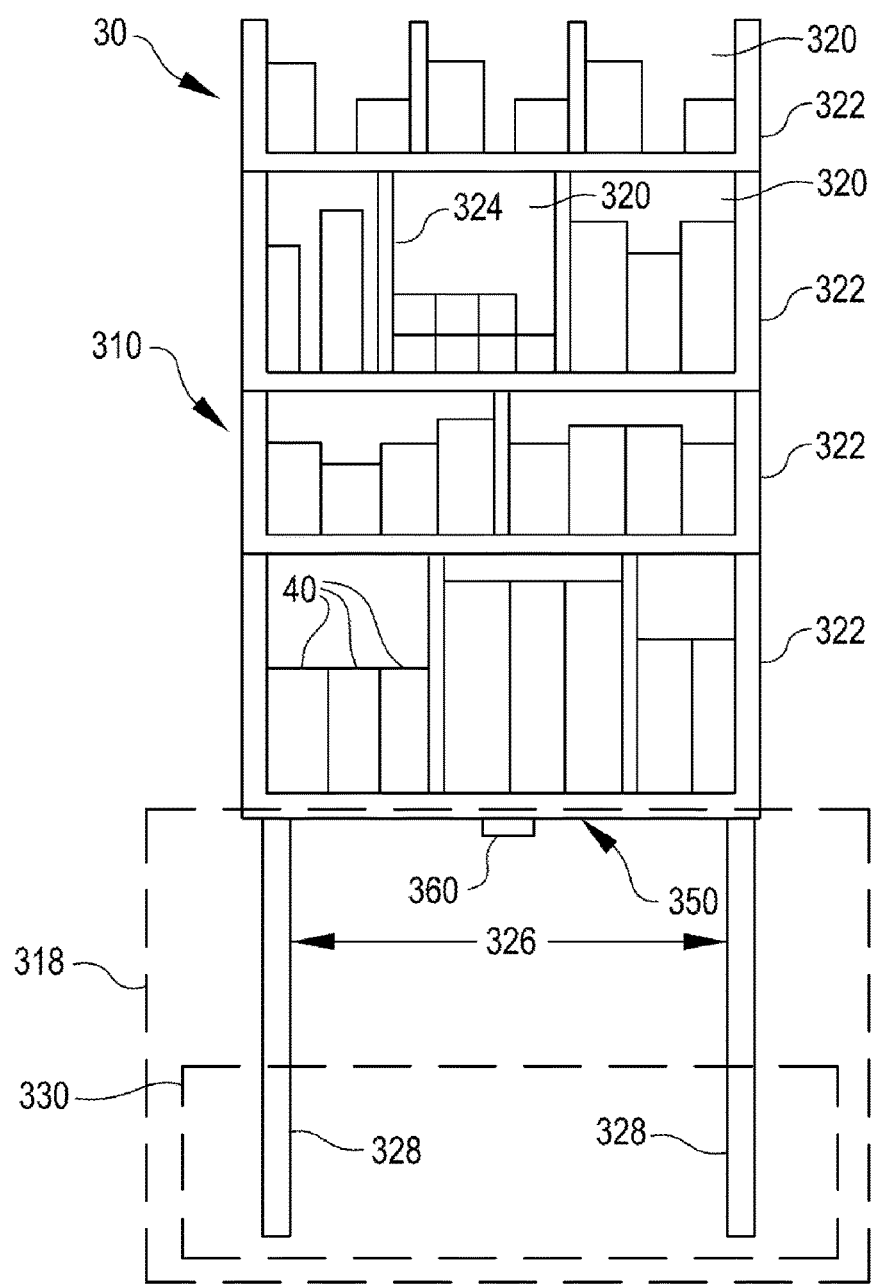
FIG. 6 illustrates in greater detail an example inventory holder that may be utilized in some examples of the inventory system shown in FIG. 3.

FIG. 6 illustrates in greater detail the components of a particular example of the inventory holder 30. In particular, FIG. 6 illustrates the structure and contents of one side of an example inventory holder 30. In a particular example, the inventory holder 30 may comprise any number of faces with similar or different structure. As illustrated, the inventory holder 30 includes a frame 310, a plurality of legs 328, and a docking surface 350.

The frame 310 holds the inventory items 40. The frame 310 provides storage space for storing the inventory items 40 external or internal to the frame 310. The storage space provided by the frame 310 may be divided into a plurality of inventory bins 320, each capable of holding the inventory items 40. The inventory bins 320 may include any appropriate storage elements, such as bins, compartments, or hooks.

In a particular example, the frame 310 is composed of a plurality of trays 322 stacked upon one another and attached to or stacked on a base 318. In such an example, the inventory bins 320 may be formed by a plurality of adjustable dividers 324 that may be moved to resize one or more inventory bins 320. In alternative examples, the frame 310 may represent a single inventory bin 320 that includes a single tray 322 and no adjustable dividers 324. Additionally, in some examples, the frame 310 may represent a load-bearing surface mounted on mobility element 330. The inventory items 40 may be stored on such an inventory holder 30 by being placed on the frame 310. In general, the frame 310 may include internal and/or external storage space divided into any appropriate number of the inventory bins 320 in any appropriate manner.

Additionally, in a particular example, the frame 310 may include a plurality of device openings 326 that allow the mobile drive unit 20 to position the platform 110 adjacent the docking surface 350. The size, shape, and placement of the device openings 326 may be determined based on the size, the shape, and other characteristics of the particular example of the mobile drive unit 20 and/or the inventory holder 30 utilized by the inventory system 10. For example, in the illustrated example, the frame 310 includes four legs 328 (e.g., 328a, 328b, 328c, and 328d) that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the platform 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in some examples, the docking surface 350 may comprise a high-friction portion. When the mobile drive unit 20 and the inventory holder 30 are docked, frictional forces induced between the platform 110 and this high-friction portion may allow the mobile drive unit 20 to maneuver the inventory holder 30. In some examples, dynamically adjusting a mounting angle of the platform 110 as described herein may provide increased traction between the docking surface 350 and the platform 110 because the mounting angle may be optimized for stability of the inventory holder 30. Additionally, in some examples, the docking surface 350 may include appropriate components suitable to receive a portion of the platform 110, couple the inventory holder 30 to the mobile drive unit 20, and/or facilitate control of the inventory holder 30 by the mobile drive unit 20.

Holder identifier 360 marks a predetermined portion of the inventory holder 30 and the mobile drive unit 20 may use the holder identifier 360 to align with the inventory holder 30 during docking and/or to determine the location of the inventory holder 30. More specifically, in some examples, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in some examples, the holder identifier 360 may represent a reflective marker that is positioned at a predetermined location on the inventory holder 30 and that the holder sensor 150 can optically detect using an appropriately-configured camera.

Depending on the configuration and characteristics of the mobile drive unit 20 and the inventory system 10, the mobile drive unit 20 may move the inventory holder 30 using a variety of appropriate methods. In a particular example, the mobile drive unit 20 is capable of moving the inventory holder 30 along a two-dimensional grid, combining movement along straight-line segments with ninety-degree rotations and arcing paths to transport the inventory holder 30 from the first location to the second location. Additionally, while moving, the mobile drive unit 20 may use fixed objects located in the workspace as reference points to assist in navigation. For example, in some examples, the inventory system 10 includes multiple fiducial marks. The mobile drive unit 20 may be configured to detect the fiducial marks and to determine the location of the mobile drive unit 20 and/or measure its movement based on the detection of the fiducial marks.

After the mobile drive unit 20 arrives at the second location, the mobile drive unit 20 may perform appropriate operations to facilitate access to inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting the inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from inventory holder 30 at this new location.

As introduced above, examples herein are directed to an inventory system that includes interference systems. Specifically, features herein are directed to interference systems that prevent undue tilting of inventory holders.

Figure 7:
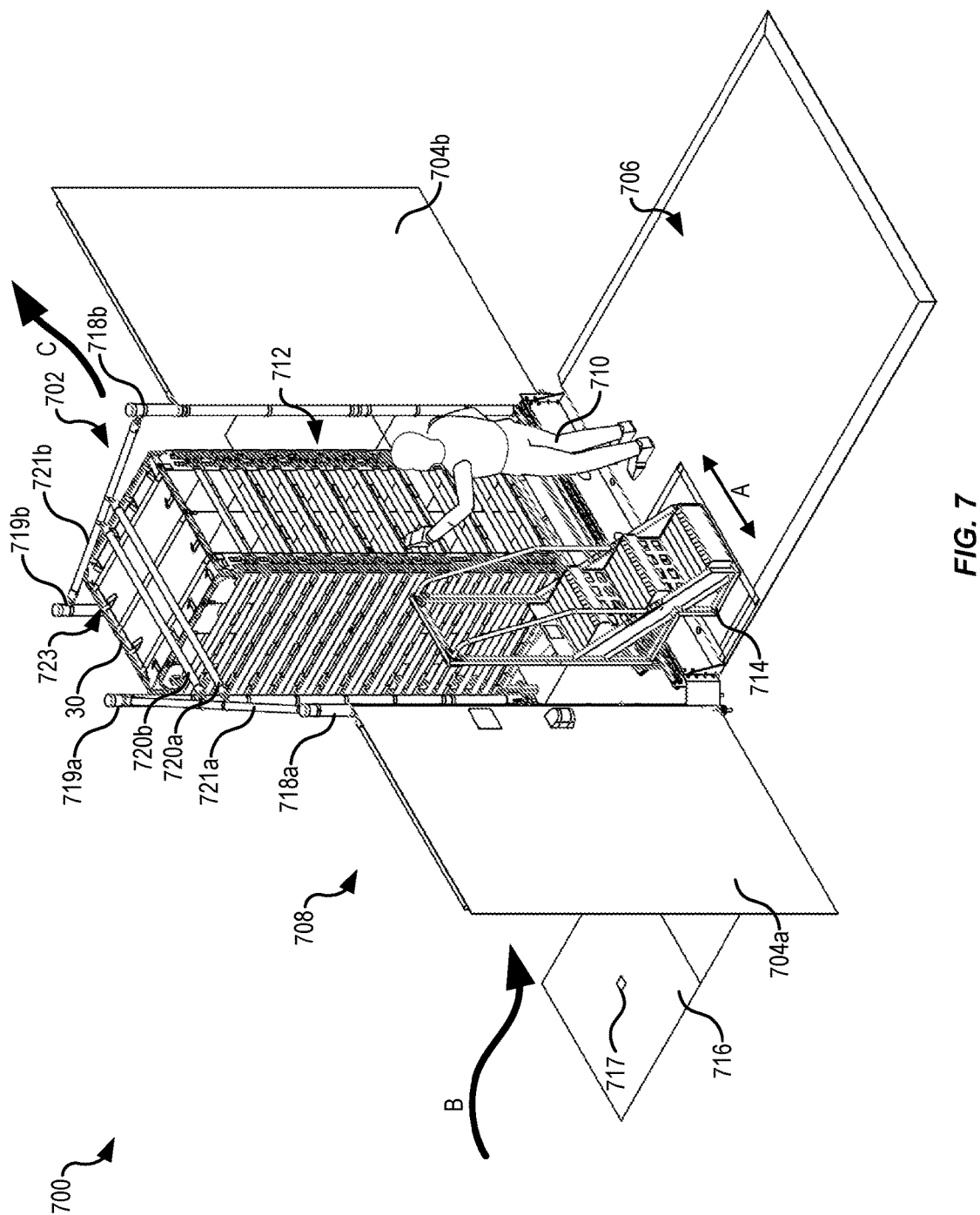
FIG. 7 illustrates a perspective view of an inventory station including an interference frame, according to at least one example.

FIG. 7 illustrates a perspective view of an inventory station 700 including an interference frame 702, according to at least one example. The inventory station 700 is an example of the inventory stations 50 described herein. The inventory station 700 can include a vertical barrier 704 that defines a worker area 706 on a nearside and a mobile drive unit area 708 on a far side.

The vertical barrier 704 may function as a physical barrier between the worker area 706 and the mobile drive unit area 708 to ensure safety of the worker 710. For example, as described herein, because the mobile drive units 20 may operate autonomously or semi-autonomously within the mobile drive unit area 708 (e.g., to lift and transport the inventory holders 30), it may be desirable to prevent the worker 710 from entering the mobile drive unit area 708.

Certain tasks, however, may require some level of interaction by the worker 710 with the inventory holders 30. The inventory station 700 may be designed to accommodate the execution of such tasks. For example, an opening 712 may be formed in the vertical barrier 704 between vertical barrier portions 704a, 704b. The opening 712 may enable the worker 710 to access the inventory holder 30 when the inventory holder 30 is positioned adjacent to the opening 712. This may be convenient for the worker 710 when performing inventory tasks with respect to inventory items stored in the inventory holder 30.

The worker area 706 may include an area in which the mobile drive units 20 are prohibited from moving. In some examples, when the inventory station 700 is used to load inventory items into the inventory holder 30, the worker area 706 may be located adjacent to an unloading dock, inbound conveyor belt, etc. In some examples, the worker area 706 may be located adjacent to a loading dock, outbound conveyor belt, packaging station, etc. The worker area 706 may also include a set of stairs 714. The set of stairs 714 may be used by the worker 710 to access a top portion of the inventory holders 30. In some examples, the set of stairs 714 is movable with respect to the opening 712. For example, the set of stairs 714 may slide laterally with respect to the opening 712, as indicated by arrow A. The set of stairs 714 may be supported by a lip that spans at least a portion of the opening 712 between the vertical barrier portions 704a, 704b.

The mobile drive unit area 708 may include a base surface 716 on which the mobile drive units 20 drive. The base surface 716 may be defined by a grid of cells of a predefined size. Each cell may include one or more fiducial marks 717 by which the mobile drive units 20 navigate. As discussed with reference to FIG. 11, in some examples, a portion of the base surface 716 directly opposite the opening 712 includes one or more interaction cells. This may be because this area includes one or more fiducial marks 717 that, when detected by the mobile drive unit 20, result in the mobile drive unit 20 stopping opposite the opening 712 to enable the worker 710 to interact with the inventory holder 30. Other portions of the base surface 716 may be considered travel cells because the mobile drive unit 20 uses the fiducial marks 717 of those cells to travel, but not necessarily to stop for human interaction. For example, the mobile drive unit 20 may approach the inventory station 700 as indicated by arrow B and leave the inventory station 700 as indicated by arrow C. In some examples, the mobile drive unit 20 may approach the inventory station 700 and leave the inventory station 700 in a direction opposite of the arrows B, C.

The interference frame 702 may be integrated into the vertical barrier 704. For example, front vertical posts 718a, 718b of the interference frame 702 may function as edges of the vertical barrier portions 704a, 704b while also defining the extents of the opening 712. Rear vertical posts 719a, 719b of the interference frame 702 may function as rear boundaries of the interference frame 702. The front vertical posts 718 can be connected to the front vertical posts 718 via upper members 721a, 721b.

The interference frame 702 may extend above a topside 723 of the inventory holder 30. For example, interference members 720a, 720b of the interference frame 702 may be positioned above the inventory holder 30 and attached to the upper members 721a, 721b. Generally, the interference members 720a, 720b are positioned at a height such that the inventory holder 30, when coupled to the mobile drive unit 20, can pass underneath the interference members 720 (and the other structures of the interference frame 702). The heights and mounting locations of the interference members 720a, 720b are selected to prevent the inventory holder 30 from tipping toward the worker area 706 beyond a predetermined amount (e.g., a tilt angle of 5 degrees).

In some examples, the heights and mounting locations of the interference members 720a, 720b are selected to also prevent the inventory holder 30 from tipping in any other possible direction. The predetermined amount introduced above, which may be expressed as a fixed value such as a tilting angle of 5 degrees, may correspond to one or more physical characteristics of the inventory holder 30. For example, when the inventory holder 30 is in the tilted orientation at the predetermined amount, the worker 710 may be able to apply a force to the inventory holder 30 to tilt the inventory holder 30 back into the upright position. As an additional example, when the inventory holder 30 is in the tilted orientation at the predetermined amount, the inventory holder 30 may be oriented such that inventory items or other objects do not fall out of the compartments of the inventory holder 30. In some examples, the inventory holder 30 may include retention bands or other structures that extend across the compartments of the inventory holder 30. Such retention bands may function to retain items and other objects within the compartments while the inventory holder 30 is upright and moving and when the inventory holder 30 is tilted.

The interference member 102 may be positioned to contact the inventory holder 30 at the topside 723 of the inventory holder 30. The topside 723 may include an uppermost or top portion of a frame of the inventory holder 30, an uppermost or top surface of the inventory holder 30 (e.g., a portion of the inventory holder that is more or less horizontal in the upright orientation), and any other structure of the inventory holder 30 that is positioned above the compartments of the inventory holder 30.

Figure 8:
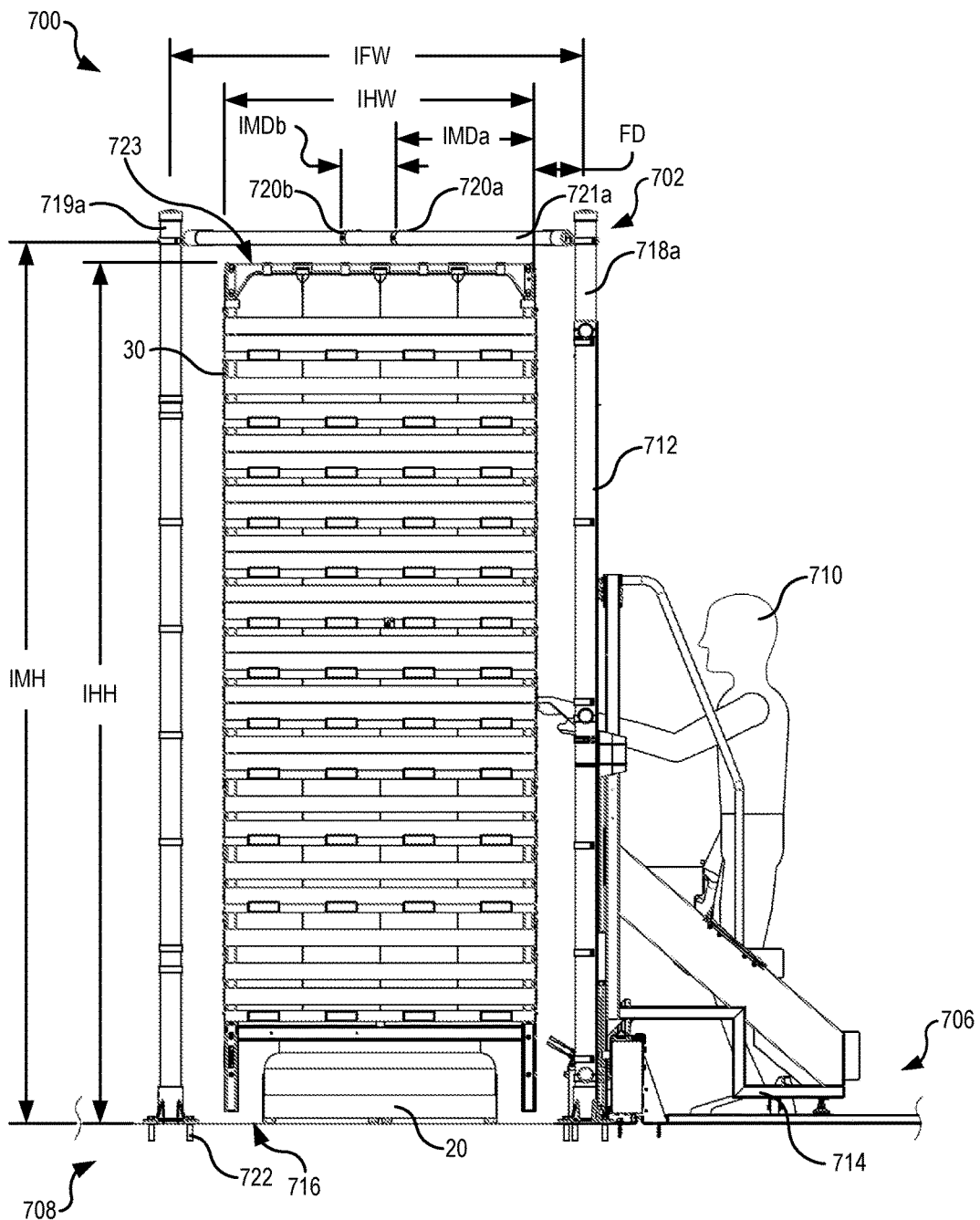
FIG. 8 illustrates a side elevation view of the inventory station shown in FIG. 7 including an inventory holder in an upright orientation, according to at least one example.
Figure 9:
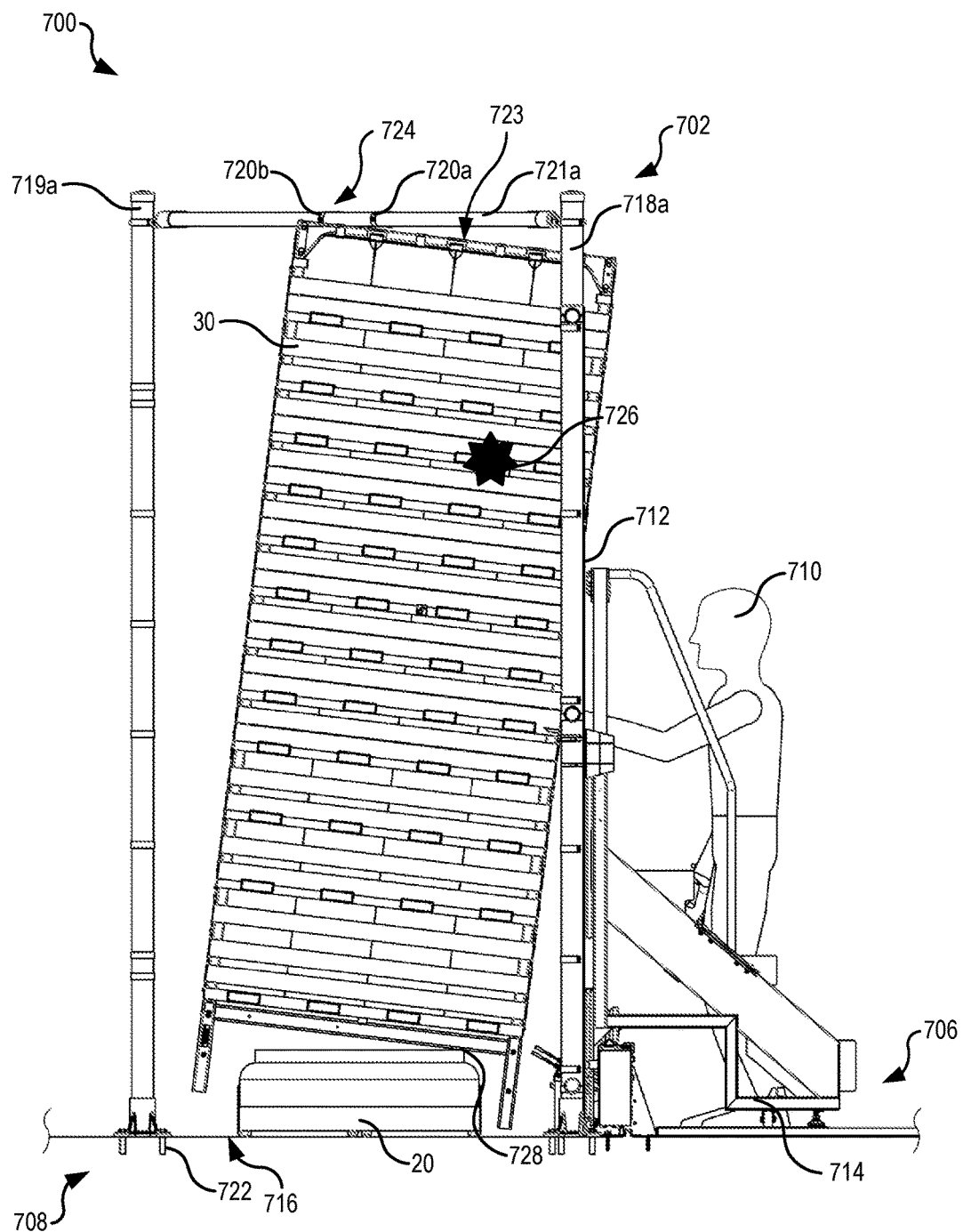
FIG. 9 illustrates a side elevation view of the inventory station shown in FIG. 7 including an inventory holder in a tilted orientation, according to at least one example.

FIGS. 8 and 9 respectively illustrate side elevation views of the inventory station 700 including the inventory holder 30 in an upright orientation and a tilted orientation, according to at least one example. The front vertical post 718a corresponds to a dividing line between the worker area 706 and the mobile drive unit area 708. As described herein, the worker 710 performs her tasks while located in the worker area 706. This can include using the set of stairs 714 to interact with the inventory holder 30.

The position of the interference member(s) 720 can be defined with respect to the base surface 716 of the inventory station 700 and the opening 712. For example, an interference frame width ("IFW") can be measured between a plane aligned with the opening 712 and the rear vertical post 719a, an inventory holder width ("IHW") can be measured between a first face of the inventory holder 30 and a second face of the inventory holder 30, a first interference member distance ("IMDa") can be measured between the interference member 720a and the first face of the inventory holder 30, a second interference member distance ("IMDb") can be measured between the two interference members 720a, 720b, a front distance ("FD") can be measured between the first face of the inventory holder 30 and the plane aligned with the opening 712, an inventory holder height ("IHH") can be measured from the base surface 716 of the inventory station 700 and the topside 723 of the inventory holder 30, and an interference member height ("IMH") can be measured between the surface of the inventory station 700 and the interference members 720.

To enable the mobile drive unit 20 and the inventory holder 30 to pass under the interference member 720 when in the upright orientation, the IMH is larger than the IHH. The difference between the IMH and the IHH and the combined distance of the IMDa and the FD (or IMDb plus IMDa pluc FD) may determine a maximum tilt angle for the inventory holder 30. For example, when the difference between the IMH and the IHH is larger, the top of the inventory holder 30 will tip further to the right (e.g., towards the opening 712) before physically contacting the interference member 720 at the topside 723 of the inventory holder 30. Likewise, when the combined distance of the IMD and the FD is smaller, the top of the inventory holder 30 will tip further to the right (e.g., towards the opening 712) before physically contacting the interference member 720 at the topside 723 of the inventory holder 30.

In some examples, the IMH and the IHH will be consistent because the height of the inventory holders 30 will not change over time. In some examples, more than one interference member 720 may be installed to account for inventory holders 30 having various IHH measurements. In this manner, a first interference member 720 (e.g., the member 720a) may be installed to prevent a first inventory holder 30 of a first height from undue tipping and a second interference member 720 (e.g., the member 720b) may be installed to prevent an inventory holder 30 of a second height from undue tipping. In some examples, a first interference member 720 (e.g., the member 720a) may be installed to prevent an inventory holder 30 from undue tipping when coupled to the mobile drive unit 20 and a second interference member 720 (e.g., the member 720b) may be installed to prevent the inventory holder 30 uncoupled from the mobile drive unit 20 from undue tipping.

In some examples, the distances IMD and FD may be variable depending on how the mobile drive unit 20 parks in front of the opening 712. For example, the mobile drive unit 20 may be authorized to stop at locations on the base surface 716 that result in the inventory holder 30 being closer to the opening 712 (e.g., a smaller FD and a larger IMD) or further from the opening 712 (e.g., a larger FD and a smaller IMD). Because of this, the interference member 720 may be placed at a combined distance of IMD and FD that ensures that no matter where the mobile drive unit 20 parks under the interference frame 702, the interference member 720 will nevertheless prevent undue tipping of the inventory holder 30. In some examples, more than one interference member 720 may be installed to account for this variability in the distance FD. For example, interference members 720 can be installed at different distances away from the opening 712 to ensure interference with the topsides 723 of the inventory holders 30 irrespective of where the mobile drive units 20 and the inventory holders 30 are positioned on the base surface 716. The front vertical posts 718 and the rear vertical posts 719 can be attached to the base surface 716 using one or more anchors 722.

As particularly illustrated in FIG. 9, when the inventory holder 30 is in the tilted orientation, the topside 723 of the inventory holder 30 physically contacts the interference member 720b at an interference region 724. Because the interference member 720b and the interference frame 702 are suitably rigid, the contact with the interference member 720b prevents the inventory holder 30 from tipping any further. In some examples, once the topside 723 and the interference member 720b contact, the inventory holder 30 will tilt back to the upright orientation. This may be because the interference frame 702, including the placement location of the interference member 720 with respect to the inventory holder 30, is designed to prevent a rotation of a worst case center of gravity 726 of the inventory holder 30 (e.g., up and to the right in FIGS. 8 and 9) beyond a tip point 728 of the inventory holder 30. This ensures that momentum of the tipping inventory holder 30 will not cause the inventory holder 30 to continue to tip.

Figure 10:
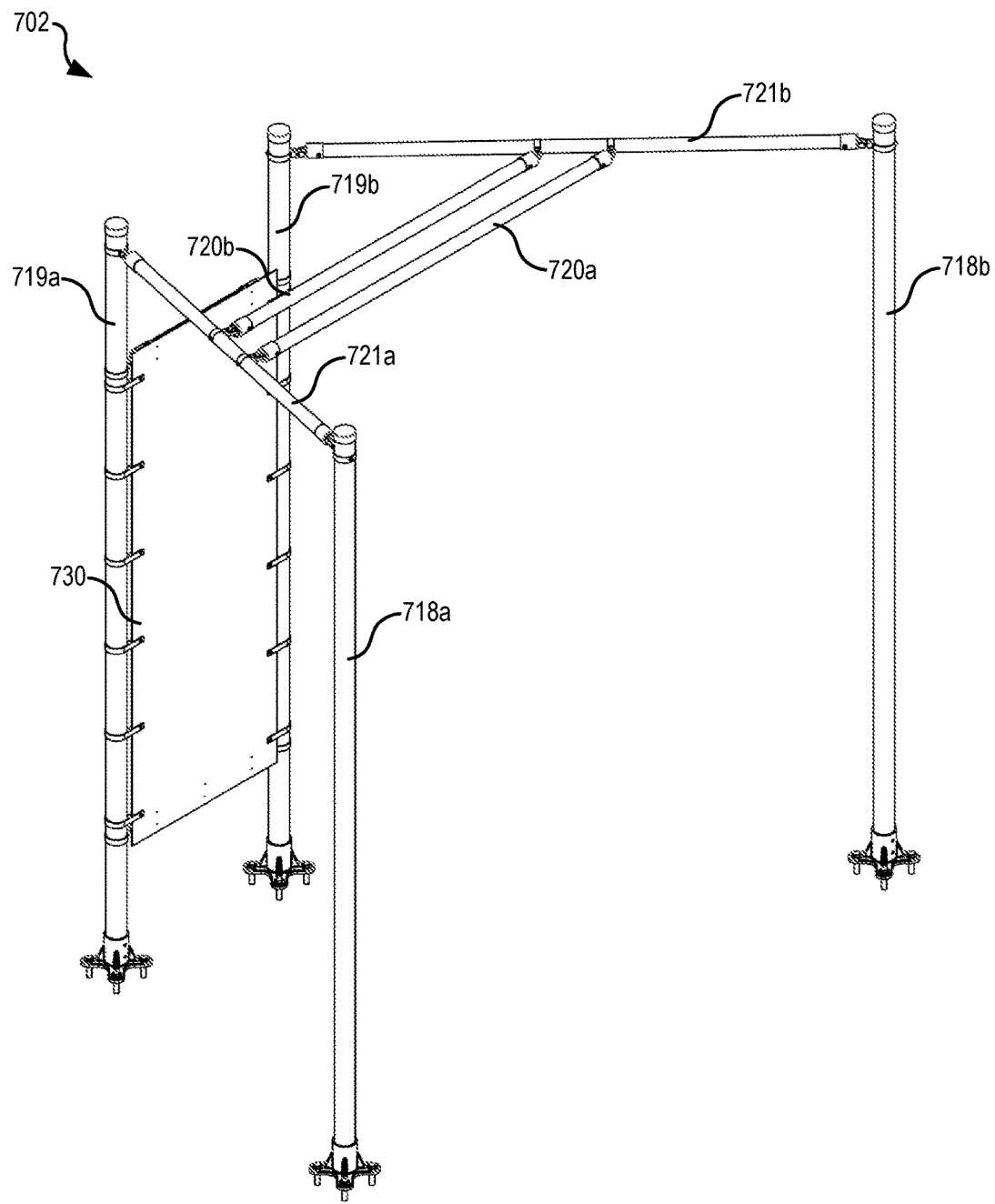
FIG. 10 illustrates a perspective view of an interference frame, according to at least one example.
Figure 11:
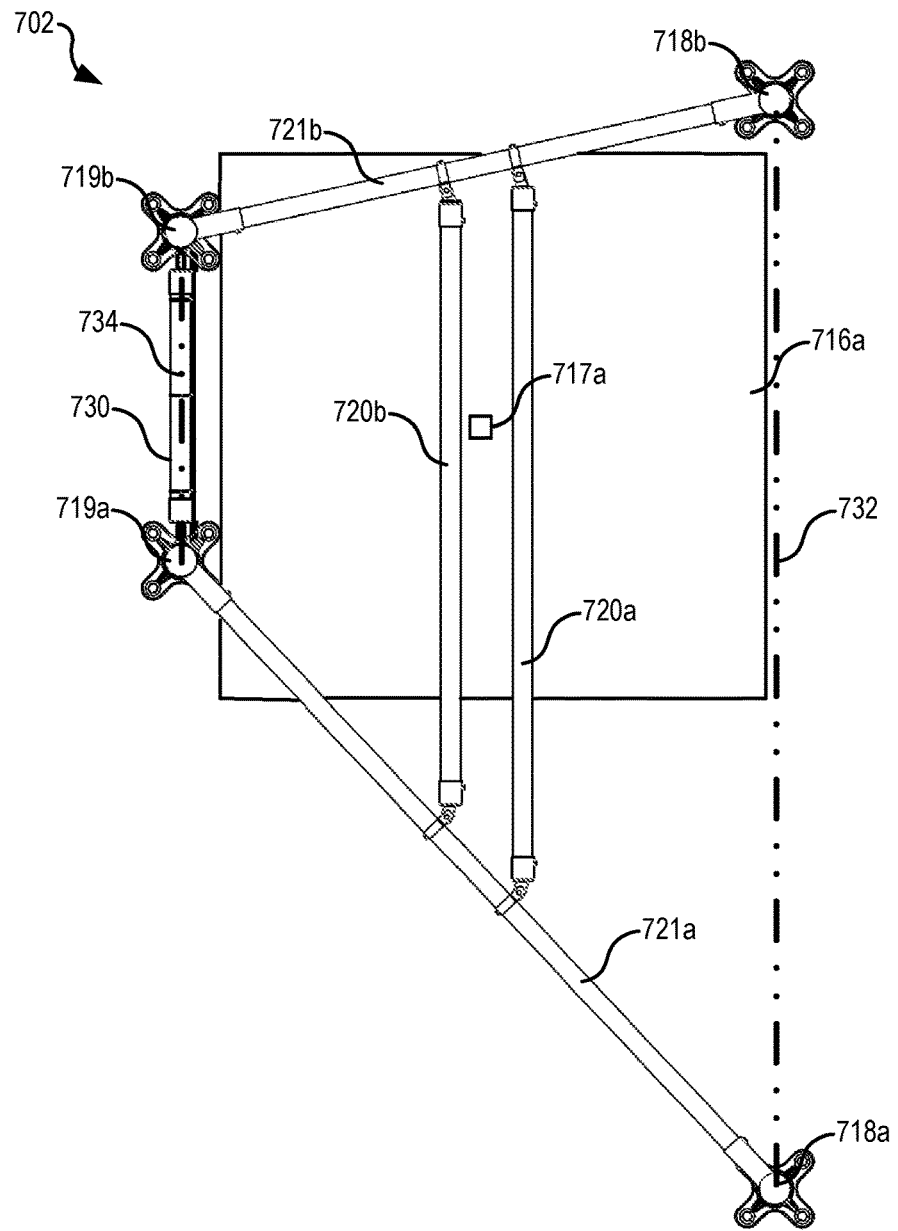
FIG. 11 illustrates a top view of the interference frame shown in FIG. 10, according to at least one example.

FIGS. 10 and 11 respectively illustrate a perspective view and a top plan view of the interference frame 702, according to at least one example. The interference frame 702 may include the front vertical posts 718, the rear vertical posts 719, the upper members 721, the interference members 720, and a safety shield 730. The front vertical posts 718 can be aligned in a first vertical plane 732, illustrated as a dashed line. The rear vertical posts 719 can be aligned in a second vertical plane 734 (illustrated as a dashed line) that is offset horizontally from the first vertical plane 732. The safety shield 730 together with the rear vertical posts 719 is configured to minimize the directions from which the mobile drive units 20 can enter under the interference frame 702. The safety shield 730 may be placed opposite the opening 712 to provide an added barrier of protection for the workers 710 (e.g., from rogue mobile drive units 20). The safety shield 730 may be formed from a section of chain link fencing material that is stretched between the rear vertical posts 719. The safety shield 730 may also be formed from a sheet of material (e.g., plywood, aluminum, steel, etc.), series of horizontally or vertically spaced bars, and in any other suitable manner.

The mobile drive units 20 may pass under the interference frame 702 by entering and/or leaving through one of two openings. A first opening is defined by the rear vertical post 719a, the upper member 721a, and the front vertical post 718a. A second opening is defined by the rear vertical post 719b, the upper member 721b, and the front vertical post 718b.

As illustrated in FIG. 11, a portion of the base surface 716 (identified by the square 716a) including a fiducial mark 717a is positioned below the interference members 720. The square portion of the base surface 716a represents an area devoted to a single inventory holder 30. Thus, in some examples, the perimeter of the square portion of the base surface 716a may correspond to an exterior perimeter of the inventory holder 30, with the exterior perimeter of the inventory holder 30 covering a slightly smaller area. This square portion of the base surface 716a may represent an interaction cell.

The mobile drive unit 20 may align itself with the fiducial mark 717a. In particular, the mobile drive unit 20 may align a central vertical axis extending from the mobile drive unit 20 and through the inventory holder 30 with the fiducial mark 717a. When this is performed, the mobile drive unit 20 and the inventory holder 30 may be positioned directly opposite the opening 712 and below the interference members 720. Even when methods other than fiducial marks 717 are used for navigation, the mobile drive unit 20 may nevertheless present itself adjacent to the opening toward the worker area.

As described herein, the interference members 720 may be supported in any suitable manner. For example, the interference frame 702 may include a single vertical post 718 or 719 and one or more interference members 720 may be attached to the single vertical post 718 or 719 and cantilevered over the base surface 716. As an additional example, the interference frame 702 may be eliminated from the inventory station 700 and the interference members 720, which may be one or more elongate members, may be attached to a ceiling and extend down toward the base surface 716. As an additional example, the interference members 720 may be a planar sheet of material that spans at least partly between the upper members 721, one or more tensioned cables extending between the upper members 721, one or more rigid tubes extending between the upper members 721, and any other suitable structure capable of preventing the inventory holder 30 from tilting.

As illustrated in FIG. 11, the interference frame 702 may be designed to have an asymmetrical shape. In some examples, the interference frame 702 has a symmetrical shape with the upper members 721 having a uniform length and the interference members 720 having a uniform length.

The interference frame 702 can be formed from any suitable building material including, for example, metal round tubing, metal square tubing, lumber, plastic, and any other suitable material. Depending on the material selecting, the elements of the interference frame 702 can be connected via knuckles and fasteners, welding, screws and nails, and any other suitable fasteners and connection techniques.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A structure, comprising:
    a barrier that when installed on a floor space of a station defines a worker area of the floor space and a mobile drive unit area of the floor space; and
    a frame that defines an opening extending between the worker area and the mobile drive unit area, the frame comprising:
        a first pair of vertical posts that when installed at the station are aligned with a first vertical plane and define the opening between the worker area and the mobile drive unit area, each vertical post of the first pair of vertical posts, when installed at the station, being in contact with the floor space adjacent to the opening and being spaced apart from the other vertical post of the first pair at a first width that is greater than or equal to an inventory holder width,
        a second pair of vertical posts that when installed at the station are aligned with a second vertical plane that is horizontally offset from the first vertical plane at an offset distance that is greater than or equal to the inventory holder width, each vertical post of the second pair of vertical posts, when installed at the station, being in contact with the floor space within the mobile drive unit area and being spaced apart from the other vertical post of the second pair at a second width; and
        an interference member that when installed at the station is spaced above a portion of the floor space in the mobile drive unit area and is connected to at least one of the first pair of vertical posts or the second pair of vertical posts, the interference member when installed at the station being positioned to:
            allow free passage of a mobile drive unit and an inventory holder underneath the interference member when the inventory holder is lifted and supported by the mobile drive unit in an upright orientation; and
            physically contact a topside of the inventory holder when the inventory holder is in a tilted orientation, thereby preventing further tilting of the inventory holder beyond the tilted orientation.

2. The structure of claim 1, wherein:
    the frame further comprises:
        a first horizontal upper member that when installed at the station extends between a first vertical post of the first pair of vertical posts and a second vertical post of the second pair of vertical posts so as to define a first inventory holder movement opening; and
        a second horizontal upper member that when installed at the station extends between a third vertical post of the first pair of vertical posts and a fourth vertical post of the second pair of vertical posts so as to define a second inventory holder movement opening; and
    the interference member when installed at the station is connected to at least one of the first horizontal upper member or the second horizontal upper member.

3. The structure of claim 1, wherein the second pair of vertical posts is configured to restrict at least one direction from which the mobile drive unit can enter the portion of the floor space in the mobile drive unit area.

4. The structure of claim 1, wherein the interference member when installed at the station is spaced above the portion of the floor space in the mobile drive unit area at a vertical elevation that is greater than a combined height of the inventory holder and the mobile drive unit.

5. A structure, comprising:
   a first interference member that when installed at a station is spaced above a surface of the station that is configured to support a mobile drive unit including an inventory holder, the first interference member when installed at the station being positioned to:
      allow free passage of the mobile drive unit and the inventory holder underneath the first interference member when the inventory holder is lifted and supported by the mobile drive unit in an upright orientation; and
      physically contact a topside of the inventory holder when the inventory holder is in a first tilted orientation, thereby preventing further tilting of the inventory holder beyond the first tilted orientation; and
   a second interference member that when installed at the station is spaced above the surface, the second interference member when installed at the station being positioned to:
      allow free passage of the mobile drive unit and the inventory holder underneath the second interference member when the inventory holder is lifted and supported by the mobile drive unit in the upright orientation; and
      physically contact the topside of the inventory holder when the inventory holder is in a second tilted orientation, thereby preventing further tilting of the inventory holder beyond the second tilted orientation.

6. The structure of claim 5, wherein at least one of the first interference member or the second interference member when installed at the station is spaced above the surface at a vertical elevation that is greater than a combined height of the inventory holder and the mobile drive unit.

7. The structure of claim 5, wherein, when the inventory holder is in the first tilted orientation, the first interference member physically contacts the topside of the inventory holder without physically contacting a side of the inventory holder.

8. The structure of claim 5, wherein at least one of the first interference member or the second interference member when installed at the station is connected to a ceiling of a facility in which the station is located.

9. The structure of claim 5, wherein:
   the structure further comprises:
      a first vertical member that when installed at the station is positioned between a worker area and a mobile drive unit area; and
      a second vertical member that when installed at the station is positioned in the mobile drive unit area; and
      at least one of the first interference member or the second interference member when installed at the station is connected to at least one of the first vertical member or the second vertical member.

10. The structure of claim 5, wherein at least one of the first interference member or the second interference member comprises at least one of an elongate rigid member, a planar rigid surface, or a tensioned cable.

11. The structure of claim 5, wherein the mobile drive unit is configured to tilt the inventory holder between the upright orientation, the first tiled orientation, and the second tilted orientation.

12. The structure of claim 5, wherein:
   the structure further comprises a vertical barrier that when installed at the station defines a worker area and a mobile drive unit area, wherein an opening is formed in the vertical barrier that allows human access to the inventory holder when the mobile drive unit and the inventory holder are positioned in the mobile drive unit area adjacent to the opening; and
   at least one of the first interference member or the second interference member when installed at the station is connected to the vertical barrier.

13. A station, comprising:
   a vertical barrier that when installed at the station defines a worker area and a mobile drive unit area, wherein an opening is formed in the vertical barrier that allows human access to an inventory holder when a mobile drive unit and the inventory holder are positioned in the mobile drive unit area;
   an interference member that when installed at that station is positioned in the opening of the vertical barrier and extends into the mobile drive unit area, the interference member when installed at the station is positioned above the mobile drive unit area to physically contact a topside of the inventory holder when the inventory holder is tilted toward the opening, thereby preventing further tilting of the inventory holder; and
   a slidable set of stairs that when installed at the station is laterally moveable with respect to the opening between:
      a first position in which the slidable set of stairs is positioned adjacent to the mobile drive unit and the inventory holder; and
      a second position in which the slidable set of stairs is offset from the mobile drive unit and the inventory holder.

14. The station of claim 13, wherein the human access to the inventory holder comprises at least one of adding a first item to the inventory holder or removing a second item from the inventory holder.

15. The station of claim 13, wherein the interference member when installed at that the station is positioned to allow free passage of the mobile drive unit and the inventory holder underneath the interference member when the inventory holder is lifted and supported by the mobile drive unit in an upright orientation.

16. A station, comprising:
   a vertical barrier formed at least in part by a first pair of vertical members that when installed at the station defines a worker area and a mobile drive unit area, wherein an opening is formed in the vertical barrier that allows human access to an inventory holder when a mobile drive unit and the inventory holder are positioned in the mobile drive unit area;
   a second pair of vertical members that when installed at the station is positioned in the mobile drive unit area and offset horizontally from the first pair of vertical members; and
   a pair of upper members that when installed at the station extend between the first pair of vertical members and the second pair of vertical members;

an interference member that when installed at that station:
  connects to each upper member of the pair of upper members;
  is positioned in the opening of the vertical barrier; and
  extends into the mobile drive unit area so as to physically contact a topside of the inventory holder when the inventory holder is tilted toward the opening, thereby preventing further tilting of the inventory holder.

17. The station of claim 16, wherein:
the first pair of vertical members when installed at the station defines the opening;
a first vertical member of the second pair of vertical members and a first portion of the vertical barrier that when installed at the station define a first mobile drive unit opening that allows the mobile drive unit to transport the inventory holder toward the opening; and
a second vertical member of the second pair of vertical members and a second portion of the vertical barrier that when installed at the station define a second mobile drive unit opening that allows the mobile drive unit to transport the inventory holder away from the opening.

* * * * *